Jan. 3, 1967   J. P. BAUERNSCHUB, JR   3,295,699
FOLDING BOOM ASSEMBLY
Filed Aug. 28, 1964                                 2 Sheets-Sheet 1
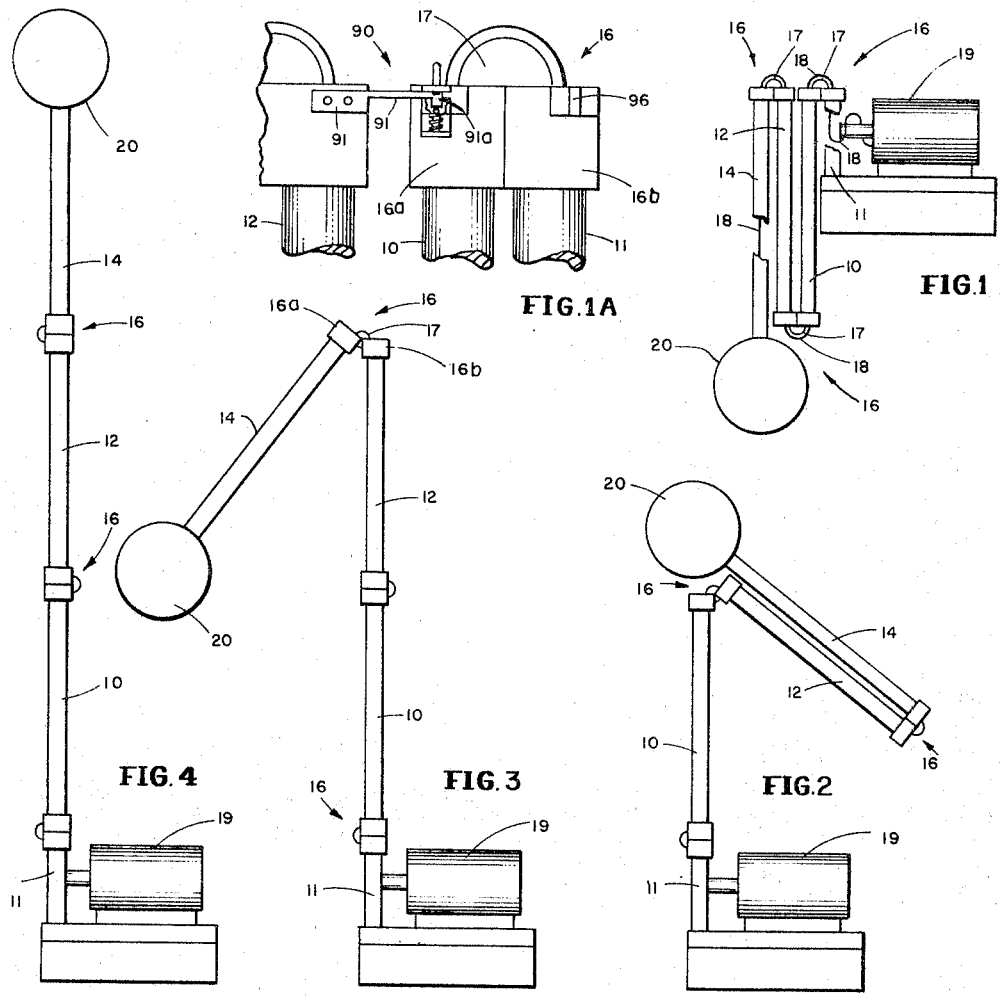
INVENTOR.
JOHN P. BAUERNSCHUB JR.
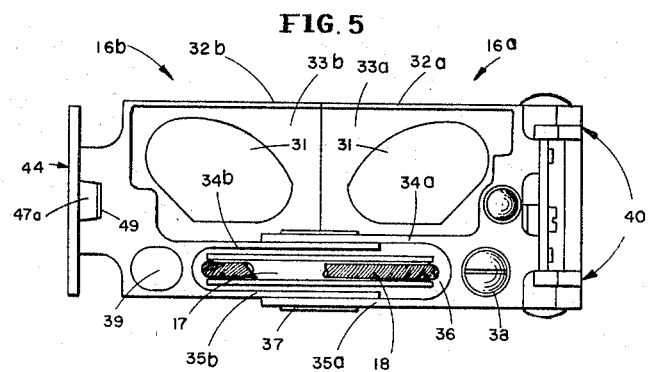
ATTORNEYS Jan. 3, 1967   J. P. BAUERNSCHUB, JR   3,295,699
FOLDING BOOM ASSEMBLY
Filed Aug. 28, 1964                         2 Sheets-Sheet 2

INVENTOR.
JOHN P. BAUERNSCHUB JR.
BY
ATTORNEY

United States Patent Office 3,295,699
Patented Jan. 3, 1967

3,295,699
FOLDING BOOM ASSEMBLY
John P. Bauernschub, Jr., Hyattsville, Md., assignor to the United States of America as represented by the Administrator of the National Aeronautics and Space Administration
Filed Aug. 28, 1964, Ser. No. 392,970
12 Claims. (Cl. 214—1)

The invention described herein may be manufactured by and for the Government of the United States of America, for governmental purposes without the payment of any royalties thereon or therefor.

This invention relates generally to a folding boom and in particular to an improved folding boom incorporating a novel triggered locking device for the knuckle joints thereof.

There are a number of instances where a boom or other similar elongated structure is provided in sections, each section joined by a knuckle joint so that the structure may be folded to conserve space when not being utilized. The boom is subsequently unfolded by sequentially closing the knuckle joints to provide a structure having a length substantially greater than the length of individual sections.

More specifically, a particularly important application of folding booms of this type is in conjunction with space vehicles where it is desirable to position scientific measuring equipment, antennae, solar paddles, and the like, a substantial distance from the body of the vehicle. By way of example, in certain geophysical experiments it is desirable to position an instrument such as a magnetometer at a distance of twenty feet or greater from the spacecraft so that measurements thereby obtained are not influenced by the spacecraft or components contained therein. In such instances the boom may be required to be much longer than the dimensions of the body of the spacecraft, and accordingly is folded and contained in the craft during launch. Once in orbit the individual sections of the boom are unfolded by sequentially closing the knuckle joints by use of a cable and pulley arrangement, which in conjunction with suitable driving means applies a closing torque to the knuckle joints.

The boom should be simple in construction and reliable in operation, capable of unfolding and securely locking individual sections into place in a desired sequence when a command signal is received by the spacecraft. For most applications the knuckle joint should provide positive locking to prevent relative movement of boom sections after closing, and should have a high degree of repeatability of the closing position. Present knuckle joints for such applications utilize a locking device wherein a spring loaded tapered pin drops into a locating hole upon closing. This provides the necessary locking but does not prevent slight movement within the knuckle joint due to clearance allowed for its pivot, tolerance of the positioning of the tapered pin relative to its locating hole, and clearance between the pin and the walls of the hole once in position. Although this movement may be acceptable in some applications, it usually cannot be tolerated for precise scientific measurements.

It is therefore among the objects of the invention to provide an improved folding boom particularly adapted to position scientific measuring apparatus from the body of a spacecraft.

Another object of the invention is to provide a folding boom having an improved locking arrangement to prevent relative movement of the knuckles of the knuckle joints joining individual sections thereof independently of the clearance of the knuckle pivot or of its moving parts.

Still another object of the invention is to provide an improved locking arrangement for a knuckle joint which will repeatedly lock the knuckle of the joint in the same position and will prevent any relative movement in a given direction between the knuckles of the joint.

A further object of the invention is to provide an improved triggered locking device for the knuckle joints of a folding boom, which boom is particularly adapted to be unfolded for positioning scientific measuring instruments a substantial distance from the body of a spacecraft.

A still further object of the invention is to provide an improved triggered locking device for knuckle joints which is simple in design and reliable in operation.

Other objects, as well as the features and attending advantages of the invention will become apparent from the following description when taken in conjunction with the accompanying drawings, in which:

FIGURE 1 is an overall assembly of the boom of the invention in its folded condition;

FIGURE 1A is a representation of the triggered latching mechanism for holding subsequent boom sections in place prior to unfolding of selected sections;

FIGURES 2 and 3 are overall assemblies of the boom of the invention in various stages of unfolding;

FIGURE 4 is an overall assembly of the boom of the invention in its unfolded condition;

FIGURE 5 is a bottom view of the knuckle joint joining adjacent boom sections illustrating the triggered locking device therefor;

Figure 6:
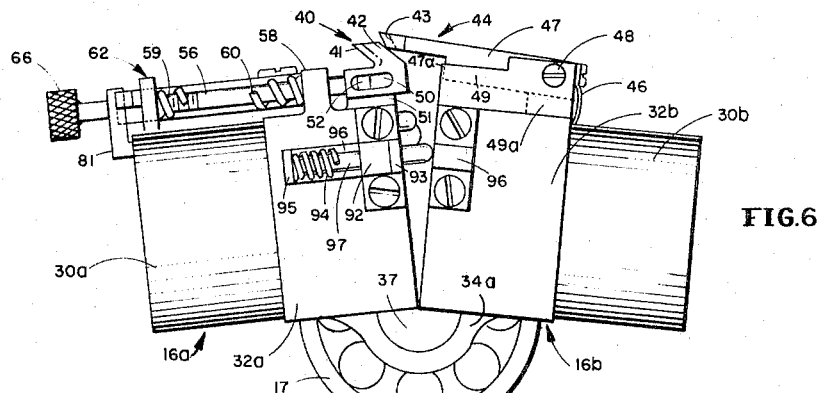
FIGURE 6 is a side view of the knuckle joint illustrating the triggered locking device just prior to closing of the joint.

According to the present invention there is provided a folding boom having a number of individual hollow sections, each joined to the other by a knuckle joint. A cable, anchored inside the extreme section, is threaded through the sections, passing around a pulley at each knuckle joint, and fastened to a reel on a drive motor. Upon receiving a command signal the motor reels in the cable and the boom is unfolded.

The knuckle joint joining individual boom sections includes first and second knuckles with a common pivot therefor, which pivot may also provide an axle for the pulley. The first knuckle carries a T-catch which engages spring loaded claw wedges on the second knuckle for locking them together. A trigger operated catch, including a trigger pin and spring retaining arms, maintains the claw wedges in a cocked condition while the joint is in an opened position. Upon closing of the knuckles of the joint the trigger pin is positively actuated to release the spring retaining arm, imparting spring pressure to the claw wedges to provide locking engagement with the T-catch. A guide pin on one knuckle and a mating hole on the other guides the knuckles into place. A latch bar may be utilized to hold adjoining sections in the folded position, and as the knuckle joint locks it releases the next section to be unfolded. The sections may be arranged to unfold in any sequence to avoid striking the spacecraft or other objects extending therefrom.

Referring now specifically to the drawings, the boom is diagrammatically illustrated in its folded condition in FIGURE 1 and in various unfolded conditions in FIGURES 2–4. Each of boom sections 10, 12 and 14 (three being shown for purposes of illustration) are joined by a knuckle joint 16. A knuckle joint 16 also joins the innermost section 10 to a post 11, which post is secured to the body of the spacecraft to provide a base for the unfolded boom. Sections 10, 12 and 14 and post 11 are hollow cylinders, preferably made of aluminum. A payload 20 (such as a magnetometer) is secured to the remote end of outermost section 14.

Suitable electrical wiring between payload 20 and the spacecraft may be contained within the hollow boom sections, passing internally through each knuckle joint. As will be subsequently described, each knuckle joint 16 includes knuckles 16a and 16b, adapted to pivot about a common axis including pulley 17. Cable 18 (illustrated in FIGURES 1 and 5) is fastened to the remote end of section 14 and passes through each section, around pulley 17 at each knuckle joint 16, and is secured to a reel on the shaft of motor 19. In instances were magnetic contamination of the experiment in payload 20 is to be avoided motor 19 may be an electric motor with a negligible residual magnetic field or a non-magnetic constant speed spring motor; in other instances, a permanent magnet D.C. motor may be used.

When activated by a command signal motor 19 reels in cable 18, applying torque to each knuckle joint, and as illustratively shown in FIGURES 2–4, sections 10, 12 and 14 are sequentially unfolded. The normal sequence is the successive closure of each joint, beginning with the section closest to the space vehicle. Other sequences, however, are possible, and accordingly a latch bar, as subsequently described, may be used to hold each adjacent section in the folded position, and unlatched by the closing of the knuckle joint of a prior section.

Referring more particularly to FIGURES 5–10, wherein knuckle joint 16 and the triggered locking device therefor is shown in detail, knuckles 16a and 16b each respectively include a tubular shank 30a and 30b (adapted to have a hollow boom section fastened thereto) and a generally rectangular body portion 32a and 32b. An aperture 31 is provided in the bulkhead between the tubular shank and the body portion of each knuckle so that electrical wiring between the spacecraft and payload 20 may be completely contained within the boom when unfolded. As can best be seen in FIGURE 5 (a bottom view of a knuckle joint 16 in its open position), body portions 32a and 32b have a generally hollow central portion 33a and 33b and also include overlapping flanges 34a, 34b, 35a and 35b, defining cavity 36. Axial pin 37 extends through flanges 34a, 34b and flanges 35a and 35b, respectively, to provide a pivot about which knuckles 16a and 16b are free to rotate through a 180° arc to provide closing of the knuckle joint. Axial pin 37 also provides a pivot for pulley 17, with clearance for pulley 17 being provided by cavity 36. Knuckle 16a contains guide pin 38 adapted to fit into mating hole 39 of knuckle 16b when closed. Preferably mating hole 39 is elliptical to allow clearance for guide pin 38 as the knuckles close while enabling accurate location in the lateral direction.

With further reference to FIGURES 5–10, a triggered locking device for securely holding knuckles 16a and 16b together once the joint has been closed includes spring loaded claw wedges 40, mounted on the top of knuckle 16a, and adapted to engage T-catch 44 mounted on the top of knuckle 16b. As best seen in FIGURE 6 (a side view of the knuckle joint prior to closing) and FIGURE 7 (a top view of the knuckle after closing) each claw wedge 40 contains a head 42 having a beveled edge 41, and T-catch 44 has a cross arm 45 with notches 43 therein. Claw wedges 40 are spaced so that beveled edges 41 engage notches 43 in cross arm 45 of T-catch 44 when the closed position. The center arm 47 of T-catch 44 has an offset portion 47a that rests in slot 49 in the top of body portion 32b of knuckle 16b, and pivots in a vertical direction about bearing 48, which bearing may be in a pin threadably secured into a land on body portion 32b and having a pin extending through center arm 47 to provide a pivot therefor. Relief 49a is provided on the rear of slot 49 to allow clearance for the pivotal movement of arm 47. Leaf spring 46 is fastened on the rear edge of arm 47 to limit the vertical motion of T-catch 44, and to return to a normally horizontal position.

The head 42 of each claw wedge 40 contains an elongated slot 50. Guide bar 52 is secured to lands 51 and extends transversely across the top of body portion 32a of knuckle 16a, extending into each slot 50 to prevent the head 42 of each claw wedge 40 from rotating. Each claw wedge 40 further includes a shank 56 that extends through a bore in bosses 58 on the top of body portion 32a of knuckle 16a. Each shank 56 terminates in a threaded portion 59.

Figure 8:
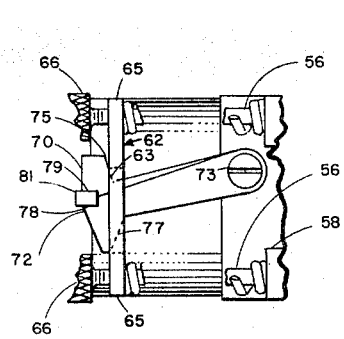
FIGURE 8 is a partial top view of the knuckle joint illustrating the manner in which the trigger assembly thereof is maintained in a cocked condition prior to closing of the joint.

A coil spring 60 surrounds shank 56 and threaded portion 59 of each claw wedge 40, and is positioned between boss 58 and claw release link 62. As best seen in FIGURE 8, claw release link 62 is comprised of bridge 63 joining flanged end portions 65, which flanged portions have a bore through which threaded portion 59 of claw wedge 40 extends. The bores in bosses 58 and flanged portions 65 are provided with sufficient clearance so that shank 58 and threaded portion 59, respectively, of claw wedges 40 may move freely in a horizontal direction, within the limits allowed by the length of slot 50 in engagement with guide bar 52. A threaded member such as nut 66 engages the end of threaded portion 59 of each claw wedge 40 on the side of flange 65 of claw release link 62 opposite to coil spring 60. The diameter of nut 66 is greater than the bore in flange 65 so that claw release link 62 may be urged forward by turning both nuts 66, thereby applying compression to coil springs 60.

Figure 9:
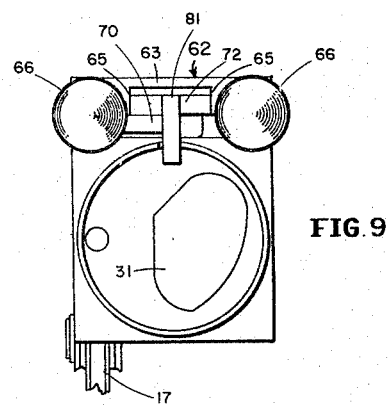
FIGURE 9 is an end view of the knuckle further illustrating the manner in which the trigger assembly thereof is maintained in a cocked condition prior to closing of the joint.

Claw release fingers 70 and 72 are secured on the top of body portion 32a of knuckle 16a, one above the other, by pivot 73. As best seen in FIGURES 8 and 9, which are partial end and top views, respectively, of knuckle joint 16a prior to closing, hook-like edges 75 and 77 on claw release fingers 70 and 72, respectively, are adapted to engage respective flanged portions 65 of claw release link 62. Separation of claw release fingers 70 and 72, thereby maintaining edges 75 and 77 in hooked engagement with flanged portions 65 of claw release link 62, is provided by pin 81 of trigger assembly 80. Pin 81 is seated in notches 78 and 79 provided on the heel of claw release fingers 70 and 72.

Figure 10:
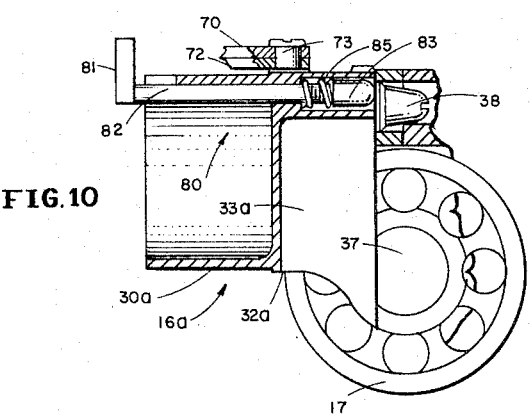
FIGURE 10 is a cross-sectional view taken along lines A—A of FIGURE 7 to illustrate the trigger assembly of the knuckle joint of the invention.

As best seen in FIGURE 10, trigger assembly 80 includes, in addition to pin 81, shank 82 that extends through a bore in body portion 32a of knuckle 16a and terminates in trigger head 83. Trigger head 83, in turn, extends beyond body portion 32a of knuckle 16a so that it engages body portion 32b of knuckle 16b just prior to closing of knuckles 16a and 16b. Trigger head 83 may be threaded on shank 82, and in conjunction with biasing spring 85 provides an adjustment for the trigger point at which trigger pin 81 is released from claw release fingers 70 and 72 to cause locking engagement between claw wedges 40 and T-catch 44. This point is adjusted so that link 62 is released simultaneously with the dropping of cross bar 45 of T-catch 44 behind beveled edges 41 on heads 42 of claw wedges 40.

Consider now the operation of the above described triggered locking device for knuckles 16a and 16b. With trigger pin 81 in place between notches 78 and 79 of claw release fingers 70 and 72 such that edges 75 and 77 thereof are in hooked engagement with flange portion 65 of claw release link 62, claw release link 62 is held in a forward position that maintains springs 60 under compression. Claw wedges 40 are set forward (shank 56 and threaded portion 59 being freely movable in the bores in flanges 65 and bosses 58) to the limit allowed by the co-action of guide bar 52 with slots 50 (that is, claw wedges 40 are moved to the right in FIGURE 6). Nuts 66 are then turned so that they are just touching flanged portions 65 of claw release link 62. Under these conditions the trigger locking device is cocked, as illustrated in FIGURES 8 and 9.

As knuckles 16a and 16b are closed by a torque resulting from reeling in cable 18, cross bar 45 of T-catch 44 rides up the rear surface of beveled edges 41 of claw wedges 40, as may be seen in FIGURE 6. When sufficiently closed, knuckle 16b engages trigger head 83 on knuckle 16a, urging trigger pin 81 to the left in FIGURE 10. Trigger head 83 is adjusted so that this occurs just as slots 43 in cross arm 45 fall in behind beveled edges 41 of claw wedges 40. Simultaneously, trigger pin 81 is urged out of notches 78 and 79 and edges 75 and 77 on claw release fingers 70 and 72, provided with a slight taper, are forced together and away from hooking engagement with flanges 65 of claw release link 62 by the pressure of springs 60. Since nuts 66 are threaded on threaded portion 59 of claw wedges 40 and are seated against flanged portions 65 of claw release link 62, translational movement is imparted to claw wedges 40 (to the left in FIGURE 6) by the action of coil spring 60. As a result, beveled edges 41 on heads 42 of claw wedges 40 are pulled against notches 43 in cross bar 45 to T-catch 44 and a firm locking engagement is maintained between knuckles 16a and 16b, with sufficient force being provided to prevent any relative motion between knuckles 16a and 16b.

As previously mentioned, it often is desirable that the individual sections of the folded boom be held by a latch bar so that they may be unfolded in a desired sequence. With reference to FIGURE 1A, latching assembly 90 is provided on the side of selected knuckles (such as the knuckles of the joint between section 10 and post 11) and arranged to engage a latch member 91 extending from the knuckle of an adjacent boom section (such as section 12) when in the folded condition. Latch member 91 is a flat bar having an ear 91a to form a hook on one end thereof.

Figure 7:
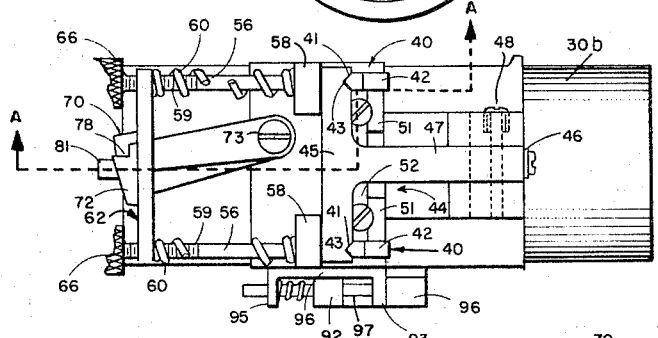
FIGURE 7 is a top view of the knuckle joint illustrating the triggered locking device subsequent to closing of the joint.

Latch assembly 90, shown in more detail in FIGURES 6 and 7, includes locking block 92 biased between stops 93 and 95 on frame 96 by spring 94. Locking block 92 has a bottom groove and is adapted to slide between stops 93 and 95, guided by a member such as a set screw extending from the bottom of frame 96. Ear 91a of latch member 91, in turn, engages the grooves in locking block 92. Trigger 97 is threaded into locking block 92, with one end extending coaxially within biasing spring 94 and the other end extending through a bore in stop 93. A further block 96 is positioned on the co-acting knuckle of the joint, and adapted to engage trigger 97 as the knuckle joint is closed. This in turn moves locking block 92 away from ear 91a of latch member 91, thus unlatching the adjacent boom section. Trigger 97 is arranged so that the boom section is unlatched just after the claw release fingers 70 and 72 are released by pin 81 as explained above. In this manner, as a pair of sections of the boom are closed the latch holding the adjacent section is released and the torque applied to cable 18 causes it to be unfolded in turn.

While the invention has been described in detail, it is to be understood that modifications and alterations thereof may be carried out by those skilled in the art without departing from the spirit and scope of the appended claims. For example, the boom can be any configuration adapted to conform to the spacecraft body and fairing, and any number of boom sections may be employed. The sections need not be of the same length, and need not be folded in the same plane. Closing of the boom sections may be in any sequence by a latching device holding adjacent sections in place until a selected joint is closed, and a micro-switch may be positioned on each knuckle to signal that the joint has been closed.

What is claimed as new and desired to be secured by Letters Patent of the United States is:

1. A folding boom including in combination, a base, a plurality of boom sections, a plurality of knuckle joints joining one boom section to said base and joining successive boom sections end-to-end, such that said boom sections are foldable in a substantially parallel relationship, each said knuckle joint comprising first and second knuckles rotatable about a common pivot, with triggered locking means mounted on said knuckles to provide a positive locking engagement therebetween upon closing of said knuckle joints, pulley means mounted coaxially of the common pivot of each said knuckle joint, a single cable having one end thereof secured to the remote one of said boom sections, said cable being looped around and coacting with said pulley means at each knuckle joint, and a reeling mechanism positioned on said base and coacting with the other end of said cable to apply a closing torque to said knuckle joints to thereby unfold said boom sections.

2. The folding boom as defined in claim 1 and wherein said triggered locking means includes a T-catch mounted on one said knuckle and a pair of claws mounted on the other said knuckle, and being operable to provide locking engagement between said T-catch and said claws upon the closing of the knuckles of a joint.

3. A folding boom as defined in claim 2 and wherein said claws have a head portion and a shank portion, with a coil spring surrounding the shank portion of each said claw, and wherein said triggered locking means includes a trigger mechanism mounted on said other knuckle for biasing said coil springs under compression with said claws in a first position, said trigger mechanism being operated by said one knuckle upon closing of said knuckle joint and as the head portion of said claws engage said T catch, said springs urging said claws to a second position to thereby provide firm locking engagement between claws and said T-catch.

4. The folding boom as defined in claim 1 and wherein said boom sections are hollow and said knuckles have a hollow portion, said cable being threaded through said boom sections and through the hollow portions of said knuckles.

5. The folding boom as defined in claim 4 wherein a triggered latching mechanism mounted on selected knuckle joints allows said boom sections to be closed in a predetermined sequence.

6. The folding boom as defined in claim 5 wherein said triggered latching mechanism includes a catch mounted on a knuckle of the joint of an adjacent pair of boom sections, and adapted to receive a latch mounted on a subsequent boom section, said catch operable to release said latch upon closing of said joint.

7. A knuckle joint including in combination, first and second knuckles rotatable around a common pivot, a T-catch pivotly mounted on one of said knuckles, a pair of claws mounted on the other of said knuckles, each said claw having a head portion and a shank portion, a coil spring surrounding the shank portion of each said claw, and locking means including a trigger mechanism mounted on said other knuckle for biasing said coil springs under compression with said claws in a first position, said trigger mechanism operable to release said locking mechanism upon closing said knuckles and as the head portion of said claws engage said T-catch, with said springs urging said claws to a second position to thereby provide firm locking between said claws and said T-catch.

8. The knuckle joint as defined in claim 7 wherein a release link having first and second bores therein extends over the shank portion of said claws and it is held in a position that maintains said coil springs under compression by first and second fingers, said fingers being held in position by a trigger member.

9. A knuckle joint as defined in claim 8 and wherein said trigger member has a shank portion with a trigger head extending through said other knuckle and adapted to engage said one knuckle upon closing of the joint, thereby releasing said release link.

10. The knuckle joint as defined in claim 9 wherein said T-catch has first and second notches therein, said notches being engaged by beveled edges on the heads of said claws as said trigger member releases said release links.

11. Apparatus for positioning scientific instruments and the like remotely from the body of a spacecraft, said apparatus including in combination, a plurality of hollow boom sections, with the near boom section being fixedly secured to the spacecraft and the remote boom section having a scientific instrument secured thereto, a plurality of knuckle joints coupling successive intervening boom sections between said near and remote boom sections, such that said boom sections are foldable to be positioned within the body of the spacecraft, each said knuckle joint comprising first and second knuckles rotatable about a common pivot, with triggered locking means mounted on said knuckles to provide positive locking engagement therebetween upon closing each said knuckle joint, pulley means mounted coaxially of said common pivot of each said knuckle joint, with a cable secured to said remote boom section and threaded through each said hollow boom section and looped around said pulley of each knuckle joint, and means for reeling in said cable to apply a closing torque to said knuckle joints, thereby unfolding said boom sections to position the scientific instrument remotely from said spacecraft.

12. Apparatus as defined in claim 11 including triggered latching mechanism mounted on the knuckle joint of selected pairs of boom sections and adapted to receive a latch mounted on a subsequent boom section, said triggered latching mechanism operable to release said latch upon the closure of the knuckle joint to release said subsequent boom section, thereby allowing sequential unfolding of said boom sections.

References Cited by the Examiner
UNITED STATES PATENTS

| | | | |
|---|---|---|---|
| 857,922 | 6/1907 | Campbell | 292—27 |
| 1,330,693 | 2/1920 | Fisher | 292—335 |
| 1,393,911 | 10/1921 | Shumaker | 292—335 |
| 1,528,515 | 3/1925 | Taylor | 70—121 |
| 1,702,621 | 2/1929 | Stelljes | 292—334 |
| 2,213,310 | 9/1940 | Gimenez | 52—108 |
| 2,524,748 | 10/1950 | Baker | 52—108 X |
| 3,009,546 | 11/1961 | Anderson | 52—108 |
| 3,187,373 | 6/1965 | Fisher | 116—144 |

MARVIN A. CHAMPION, *Primary Examiner.*